Aug. 29, 1933.  A. PETELER  1,924,374
SHOCK ABSORBER AND THERMOSTAT THEREFOR
Filed Aug. 1, 1931
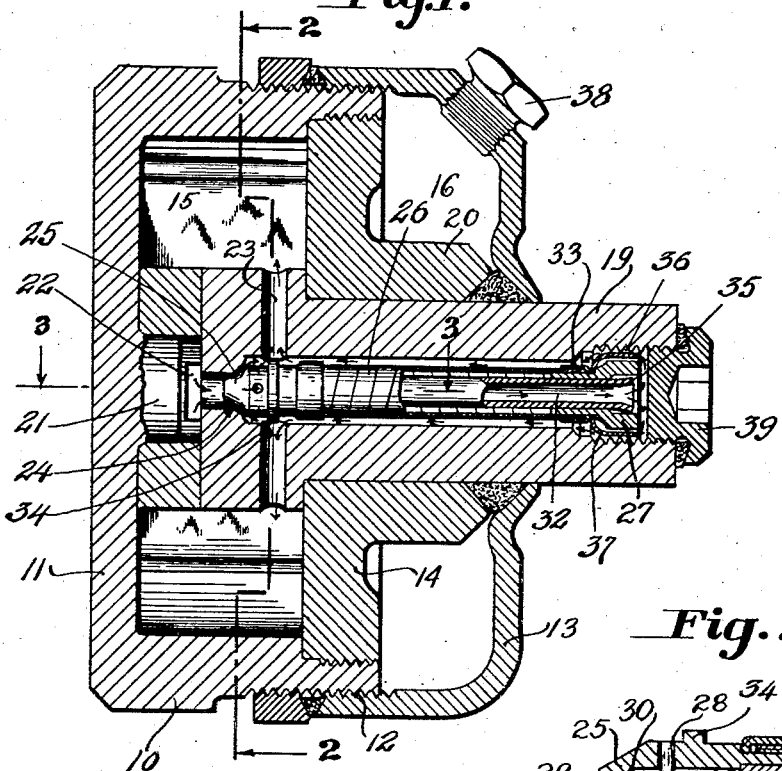
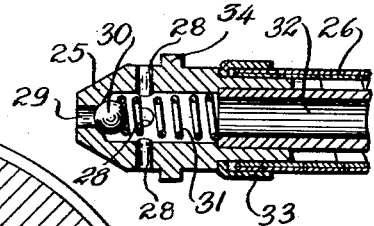
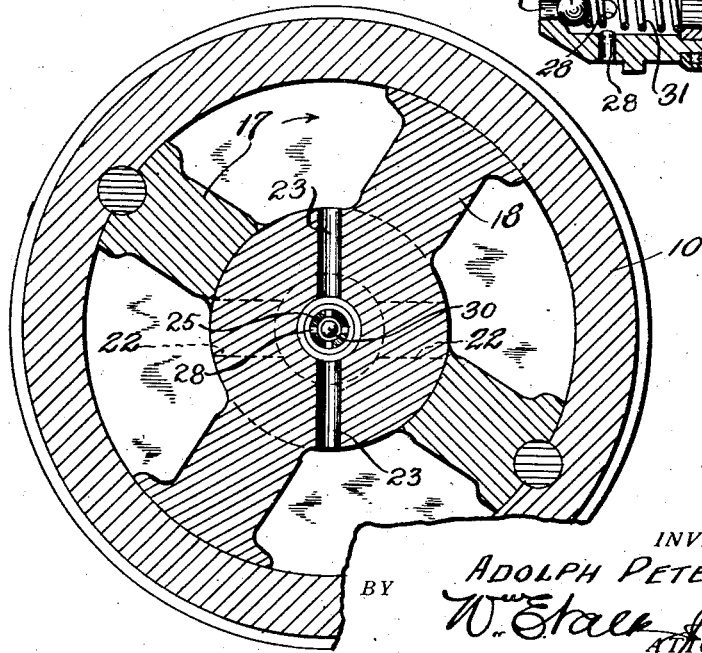
INVENTOR
ADOLPH PETELER
BY
ATTORNEY

Patented Aug. 29, 1933

1,924,374

UNITED STATES PATENT OFFICE

1,924,374

SHOCK ABSORBER AND THERMOSTAT THEREFOR

Adolph Peteler, Freeport, N. Y.

Application August 1, 1931. Serial No. 554,487

13 Claims. (Cl. 188—100)

My invention relates to hydraulic shock absorbers and more particularly to improvements in thermostats and valves suitable for use therewith.

In thermostatically controlled hydraulic shock absorbers, the shock encountered is usually cushioned by the passage of liquid from one to another chamber thru a relatively small orifice or opening. The size of the orifice is usually adjusted in accordance with the weight of the vehicle and the character of the liquid employed in the shock absorbing device. Having initially adjusted the size of the orifice to secure the best riding qualities, the effective area thereof is thereafter controlled automatically and varied in accordance with variations in temperature of the cushioning liquid. In other words, when the cushioning liquid is up or near the upper temperature limit and flows freely, the size of the orifice is smallest, and, as the temperature of the liquid is lowered, and its viscosity increased, the size of the orifice is proportionately increased to render the operation of the shock absorber uniform regardless of temperature changes.

At the present time there are two types of hydraulic shock absorbers in more or less extensive use. One of these types is known as the "Houde" shock absorber, and the other is a shock absorber of the cylinder and piston type. As illustrative of the latter type shock absorber reference may be had to applications Serial Nos. 338,069—399,992 and 502,642 filed February 7, 1929, October 16, 1929, and December 16, 1930, respectively, the two last filed of which disclose thermostats generally similar to that type thermostat with which the present invention is concerned. The advantages of thermostats characterized as set forth in said two last filed and now pending applications will not be herein repeated. Suffice it to say that said thermostats have been and are now being used with unqualified success in hydraulic shock absorbers of the cylinder and piston type. There is, on the other hand, no record of the general acceptance by the trade of any other type of thermostat for any known type of hydraulic shock absorber.

Having developed an acceptable type thermostat for the cylinder and piston type shock absorber, it now remains to produce an acceptable type thermostat for shock absorbers of the Houde type. In the Houde type shock absorber a chamber is provided within which the thermostat unit can conveniently be disposed. This chamber, however, if a construction similar to that proposed in U. S. Patent 1,686,381 is adopted, is more or less isolated from the cushioning liquid in circulation. Either the cushioning liquid is kept entirely without the chamber or reservoir, or if permitted to enter thereinto, is trapped, as it were, and held under pressure against further circulation. As a thermostat to be entirely operative and wholly satisfactory must be at all times subject to the changes in temperature occurring in the cushioning liquid itself, it is obvious that provision must be made for the circulation of the cushioning liquid in and around the thermostat. The present invention has for one of its objects to admit of such circulation of a cushioning liquid.

A further object of the invention is to provide a thermostat unit which can be used to advantage in standardized types of hydraulic shock absorbers such as the Houde and other similar types.

A further object of the invention is to so organize the parts comprising the thermostat unit as to admit of the fluid in circulation coming in contact at all times with the exterior surface of the thermostat.

A still further object of the invention is to provide a thermostat for hydraulic shock absorbers which is strong enough to withstand indefinitely the enormous pressures encountered in actual operation, and yet sensitive enough to insure accuracy of adjustment of the size of the passage or orifice through which the cushioning liquid is forced.

A still further object of the invention is to provide in association with thermostatically controlled valve, a pressure relief valve; the latter being operative automatically to relieve the thermostatically controlled valve, and hence the thermostat, of inordinately heavy shocks.

Other and further objects of the invention will be hereinafter set forth.

In the drawing:

Fig. 1 is a sectional plan view of a Houde shock absorber;

Fig. 2 is a section on the line 2—2 of Fig. 1; and

Fig. 3 is an enlarged longitudinal sectional view of a portion of the thermostat and the whole of the valve unit.

In the embodiment of the invention selected for illustration a shock absorber of the Houde type is shown. It comprises an annular casing 10 provided with a base portion 11, for attachment to a vehicle frame. Preferably the casing 10 is exteriorly threaded as at 12 to receive a cover 13. Mounted inside the casing is a head 14 which divides the interior into two separate chambers 15 and 16, each of which is supplied with a cushioning liquid such as oil or glycerine.

A fixed transverse partition 17 divides the chamber 15, which for convenience is termed a pressure chamber, into separate compartments, and each wing or vane of said partition has formed therein a ball check valve (not shown). The chamber 16, which acts as a replenishing chamber, communicates with the pressure chamber to keep the latter constantly supplied with liquid.

There is also provided within the chamber 15 a movable transverse partition 18, the wings or vanes of which move back and forth toward and from the fixed vanes of the partition 17. Said movable partition is preferably formed as an integral enlargement at the inner end of a hollow shaft or sleeve 19 to which is attached an arm (not shown) fastened to the vehicle in the usual manner. Thus constructed and assembled, shocks are absorbed thru the dash-pot effect created by the movements of said partition 18 within the pressure chamber. An enlargement 20 formed on the head 14, and a boss 21 formed on the base portion 11, hold the shaft 19 in place.

To admit of the transfer of the cushioning liquid from one side to the other of the wings or vanes of the movable partition 18 when the shaft 19 is turned in the direction of the arrow, radial ports 22—22 and 23—23 are formed in the hubs of the fixed partition and the movable partition respectively. The ports, in each instance, are open at one end to the hollow of the shaft 19. Within said hollow shaft, intermediately of the ports 22—22 and 23—23 there is formed a valve seat 24. To regulate the effective area of said passage or orifice thru which the liquid is thus passed, an automatically acting thermostatically controlled needle valve 25 is provided. Said valve is adapted to move, as temperature changes occur, toward and from said seat. As the temperature of the cushioning liquid increases, the valve is caused to move toward said seat thereby restricting the effective area of said passage to compensate for the decreased viscosity of the cushioning liquid in warmer weather. On the contrary, as the temperature drops, the valve 25 is caused to move away from its seat to thus automatically compensate for the increased viscosity of the liquid. In either case the action is entirely automatic so as to render the operation of the shock absorber uniform regardless of temperature conditions.

Basically, the thermostat herein disclosed is the same as that form of thermostat disclosed in said co-pending applications Serial Nos. 399,992 and 502,642. It comprises a coil 26 formed from a continuous unitary strip of two layers of metals of different coefficients of expansion, to the opposite ends of which the needle valve 25 and an exteriorly threaded adjusting member 27 are respectively fastened. The valve 25 is preferably smaller in diameter than the inside diameter of the chamber within which it is fitted. Exteriorly it is provided with an annular integral flange 34, said flange being so disposed in its relation to the ports 23—23 as to at all times extend intermediately across the adjacent ends thereof (see Fig. 2). The purpose of said flange is twofold. First, it acts to center the thermostat unit within the chamber or hollow shaft 19 and thus prevents chattering, and second, it acts to deflect a substantial portion of the cushioning liquid to radial passages 28 formed in the valve 25. The valve 25 is hollow as shown, and in addition to the passages 28 has formed therein a center passage 29. The passages 28 are at all times in open communication with the hollow of the valve, whereas the passage 29 is normally closed by a ball check valve 30 yieldingly held in engagement with its seat by a suitable spring 31. The function of the valve 30 is that of a relief or safety valve tending to prevent damage to the thermostat in case of an overload. The operation of the shock absorber, however, is in no way dependent upon the use of said safety relief valve and it may be dispensed with if desired. When opened under excess pressure, the oil or cushioning liquid entering through the passage 29 is free to escape by way of the radial passages 28 or to enter the chamber within which the coil 26 is fitted. The arrows (Fig. 2) indicate the direction of the flow of the cushioning liquid. It will be noted that a substantial portion of the cushioning liquid is by-passed into the chamber or hollow shaft 19 where it is free to circulate through and around the exterior wall of the thermostat.

To prevent undue elongation of the coil 26, and at the same time serve as an oil lead and coil stiffener, a tube 32, coextensive with the coil, is fastened at one end within the hollow of the valve 25. At its opposite end it is peened over or turned outwardly as at 35 and is loosely carried through the adjusting member 27. As the coil contracts and expands due to changes in temperature of the cushioning liquid the tube 32 moves axially with the valve and at all times relatively to the adjusting member. The tube 32 at its outer end is open to the chamber, whereas, at its inner end, it is open to the hollow of the valve. Thus organized the cushioning liquid by-passed through the passages 28 and 29 is conveyed by way of said tube through the thermostat, and is discharged into the chamber at or near its outer end. Collars or bands 33—33 tightly encircling the opposite ends of the coil 26 provide at its opposite ends an appropriate means for fastening the coil to the valve 25 and to the adjusting member 27, respectively.

The member 27 is threaded in the hollow of the shaft 19 and is adjustable manually to admit of a proper setting of the valve. To secure adjustment, said member has formed therein longitudinally extending grooves 36 within certain of which the prongs of a spanner wrench may be inserted and within others of which the tongues of a friction lock spring 37 are fitted. The tongues of the lock spring 37 bear frictionally against the internal threads of the hollow shaft and by such friction contact lock the thermostat and hence the valve in its adjusted position. The grooves 36 also function as oil passages admitting of the free circulation of the oil or cushioning liquid around and about the exterior surface of the coil. It will be seen, therefore, that the oil in circulation makes direct contact with the thermostat under all operating conditions. The inner end of the tube 32, if desired, may serve as an abutment for the spring 31. The oil within the shock absorber may be replenished by a removable filler plug 38.

From the above, taken in connection with the accompanying drawing, it is apparent that the thermostat is at all times immersed or in direct contact with the cushioning liquid; that by reason of such contact the thermostat is made immediately responsive to all temperature changes occurring in the oil in circulation; that with each shock absorbing impulse, a certain amount of the oil in circulation is directed into the tube 32 thru the radial openings 28 formed in the valves; and that the oil or cushioning liquid, having entered the tube, is free to flow around and about the exterior surface of the thermostat since the hollow of the shaft 19 is open at both ends and in the normal operation of the shock absorbers will at all times contain a sufficient body of oil to admit of the desired heat convection. To close the hollow shaft 19 at its outer end, a packing nut 39 is provided.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

I claim as my invention:

1. In a hydraulic shock absorber having a passage formed therein thru which the cushioning liquid is forced, a valve movable to vary the effective area of said passage, said valve having formed therein a by-pass, and a thermostatic element around which the cushioning liquid entering said by-pass is free to circulate, said thermostatic element being operable to move said valve in accordance with variations in temperature of the cushioning liquid.

2. In a hydraulic shock absorber having a passage formed therein thru which the cushioning liquid is forced, a valve movable to vary the effective area of said passage, said valve having formed therein a by-pass, and a hollow thermostatic element thru which the cushioning liquid entering said by-pass is adapted to circulate, said thermostatic element being operable to move said valve in accordance with variations in temperature of the cushioning liquid.

3. In a hydraulic shock absorber having a passage formed therein thru which the cushioning liquid is forced, a valve movable to vary the effective area of said passage, said valve having formed therein a by-pass, and a hollow thermostatic element thru and around the exterior surface of which the cushioning liquid entering said by-pass is free to circulate, said thermostatic element being operable to move said valve in accordance with variations in temperature of the cushioning liquid.

4. In a hydraulic shock absorber having a passage formed therein thru which the cushioning liquid is forced, a valve movable to vary the effective area of said passage, said valve having formed therein a by-pass, a tube in open communication with said by-pass, said tube being fastened to and movable with said valve, and a thermostatic element coextensive with and encircling said tube and around the exterior surface of which the cushioning liquid entering said by-pass is free to circulate, said thermostatic element being operable to move said valve in accordance with variations in temperature of the cushioning liquid.

5. In a hydraulic shock absorber having a passage formed therein thru which the cushioning liquid is forced, a valve movable to vary the effective area of said passage, a chamber extending off from said passage and to which a quantity of the cushioning liquid is by-passed, and a thermostatic element housed within said chamber and around which the by-passed cushioning liquid is free to circulate, said thermostatic element being operable to move said valve in accordance with variations in temperature of the cushioning liquid.

6. In a hydraulic shock absorber having a passage formed therein thru which the cushioning liquid is forced, a valve movable to vary the effective area of said passage, a chamber open at one end to said passage and into which a quantity of the cushioning liquid is by-passed regardless of the position of adjustment of said valve, and a thermostatic element within said chamber thru and around the exterior surface of which the by-passed liquid is circulated, said thermostatic element being operable to automatically adjust said valve in its relation to said passage in accordance with variations in temperature of the cushioning liquid.

7. In a hydraulic shock absorber having formed therein a passage thru which the cushioning liquid is forced, a valve movable to vary the effective area of said passage, said valve having formed therein, a by-pass, means for directing toward said by-pass a quantity of the cushioning liquid forced thru said passage, and a thermostatic element around which the cushioning liquid entering said by-pass is free to circulate, said thermostatic element being operable to move said valve in accordance with variations in temperature of the cushioning liquid.

8. In a hydraulic shock absorber having a passage formed therein thru which the cushioning liquid is forced, a valve movable to vary the effective area of said passage, said valve having formed therein a by-pass, a shoulder formed upon said valve for directing toward said by-pass a quantity of the cushioning liquid forced thru said passage, and a thermostatic element around which the cushioning liquid entering said by-pass is free to circulate, said thermostatic element being operable to move said valve in accordance with variations in temperature of the cushioning liquid.

9. In a hydraulic shock absorber having a passage formed therein thru which the cushioning liquid is forced, a valve movable to vary the effective area of said passage, said valve having formed therein a by-pass, an annular flange formed upon the exterior surface of said valve in proximity to said by-pass for directing toward said by-pass a quantity of the cushioning liquid forced thru said passage, and a thermostatic element around which the cushioning liquid entering said by-pass is free to circulate, said thermostatic element being operable to move said valve in accordance with variations in temperature of the cushioning liquid.

10. In a hydraulic shock absorber having a passage forced therein thru which the cushioning liquid is forced, a valve movable to vary the effective area of said passage, said valve having formed therein a by-pass, means carried by said valve and extending into said passage for directing toward said by-pass a quantity of the cushioning liquid forced thru said passage, and a thermostatic element around which the cushioning liquid entering said by-pass is free to circulate, said thermostatic element being operable to move said valve in accordance with variations in temperature of the cushioning liquid.

11. In a hydraulic shock absorber having a passage formed therein thru which the cushioning liquid is forced, a valve movable to vary the effective area of said passage, a pressure relief valve associated with and operable independently of said first mentioned valve, and a thermostatic element around which the cushioning liquid passing said pressure relief valve is free to circulate, said thermostatic element being operable to move said first mentioned valve in accordance with variations in temperature of the cushioning liquid.

12. A thermostatically controlled valve for hydraulic shock absorbers including a needle valve, an adjusting member, a thermostatic element extending between said valve and said adjusting member, and a tube fastened to said valve and extending thru said thermostat, said tube having at one end a sliding fit within said adjusting member.

13. A thermostatically controlled valve for hydraulic shock absorbers including a needle valve, an adjusting member, a thermostatic element fastened to and extending between said valve and said adjusting member for automatically adjusting the position of said valve without affecting in any way the adjusted position of said member, and a rigid element extending between said valve and said adjustng member for limiting the extent to which said valve may be adjusted in its relation to said member, said element having a sliding fit at one end within said adjusting member to admit of its movement with said valve.

ADOLPH PETELER.